(12) United States Patent
Jo

(10) Patent No.: US 7,843,436 B2
(45) Date of Patent: Nov. 30, 2010

(54) PORTABLE INFORMATION PROCESSING APPARATUS

(75) Inventor: Whan-haeng Jo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 867 days.

(21) Appl. No.: 11/741,956

(22) Filed: Apr. 30, 2007

(65) Prior Publication Data

US 2008/0174556 A1    Jul. 24, 2008

(30) Foreign Application Priority Data

Jan. 24, 2007    (KR) ...................... 10-2007-0007661

(51) Int. Cl.
*G06F 3/02*    (2006.01)
*G06F 3/033*    (2006.01)

(52) U.S. Cl. ...................... 345/168; 345/161; 345/163; 345/169

(58) Field of Classification Search ......... 345/156–184; 361/679.01–679.61
See application file for complete search history.

(56) References Cited

U.S. PATENT DOCUMENTS

| | | | |
|---|---|---|---|
| 4,687,200 A * | 8/1987 | Shirai ........................... | 463/37 |
| 6,121,529 A * | 9/2000 | Nakata et al. ............. | 84/477 R |
| 6,512,511 B2 * | 1/2003 | Willner et al. .............. | 345/169 |
| 7,206,616 B2 * | 4/2007 | Choi ........................ | 455/575.1 |
| 7,224,345 B2 * | 5/2007 | Kawell et al. ................ | 345/169 |
| 7,280,346 B2 * | 10/2007 | Lewis et al. ............ | 361/679.01 |
| 7,330,175 B2 * | 2/2008 | Miyashita et al. ........... | 345/156 |
| 2002/0118175 A1 * | 8/2002 | Liebenow et al. ........... | 345/168 |
| 2005/0078090 A1 * | 4/2005 | Glatzer et al. ............... | 345/168 |
| 2005/0248545 A1 * | 11/2005 | Nishimura et al. .......... | 345/173 |
| 2006/0202865 A1 * | 9/2006 | Nguyen ....................... | 341/22 |
| 2007/0205983 A1 * | 9/2007 | Naimo ........................ | 345/160 |
| 2007/0279388 A1 * | 12/2007 | Pletikosa et al. ............ | 345/169 |
| 2008/0024957 A1 * | 1/2008 | Lee ............................. | 361/600 |

OTHER PUBLICATIONS

Copending U.S. Appl. No. 11/739,810, filed Apr. 25, 2007, entitled "Portable Information Processing Apparatus".

* cited by examiner

*Primary Examiner*—David L Lewis
(74) *Attorney, Agent, or Firm*—Stanzione & Kim LLP

(57) ABSTRACT

A portable information processing apparatus including a main body including a display opening and a front panel surface surrounding the display opening, a display unit to display an image through the display opening, a key button input unit oppositely arranged across the display unit in a first portion of the front panel surface and an additional input unit including at least one additional input unit in a second portion of the front panel surface.

24 Claims, 5 Drawing Sheets ated States Patent

PORTABLE INFORMATION PROCESSING APPARATUS

CROSS-REFERENCE TO RELATED APPLICATIONS

This application claims priority under 35 U.S.C. §119(a) from Korean Patent Application No. 2007-007661 filed on Jan. 24, 2007, in the Korean Intellectual Property Office, the disclosures of which are incorporated herein in its entirety by reference This application is related to commonly-owned application Ser. No. 11/739,810, entitled "Portable Information Processing Apparatus", by Dong-jin Lee and filed contemporaneously herewith, which related application is incorporated herein in its entirety by reference.

BACKGROUND OF THE INVENTION

1. Field of the Invention

The present general inventive concept relates to a portable information processing apparatus, and more particularly, to a portable information processing apparatus having an improved structure of an input unit and an output unit on a front panel.

2. Description of the Related Art

In general, a portable information processing apparatus is used in processing various information and provides convenience to a user in his/her daily life. As an example of the portable information processing apparatus, there are an MP3 player, a personal digital assistant (PDA), a cellular phone, an electronic frame and a portable multimedia player (PMP), etc. Hereinafter, an ultra mobile personal computer (UMPC) will be described as a small, portable and multifunctional portable computer, i.e., the portable information processing apparatus.

The UMPC is a kind of data processor, and has functions of a notebook, a tablet personal computer, a navigator, a portable storage, a portable multimedia player (PMP), a personal digital assistant (PDA), a digital multimedia broadcasting (DMB) player, etc. Such an UMPC is lightweight, small-sized and portable, so that it is convenient for a user to transport. The UMPC allows a user to input and output information or the like in various environments.

Therefore, if an input unit and an output unit are efficiently arranged in the ultra mobile personal computer (UMPC), it will be convenient for a user to input information, data, etc and output inputted and stored information.

SUMMARY OF THE INVENTION

The present general inventive concept provides a portable information processing apparatus in which an input unit and/or output unit is efficiently arranged.

The present general inventive concept provides a portable information processing apparatus in which a path of a user's manipulation of an input unit is minimized.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept can be achieved by providing a portable information processing apparatus including a main body including a display opening and a front panel surface surrounding the display opening, a display unit to display an image through the display opening, a key button input unit oppositely arranged across the display unit in a first portion of the front panel surface and an additional input unit including at least one additional input unit in a second portion of the front panel surface.

The display opening can be provided in a center portion of the front panel surface, and the key button input unit includes a first key group and a second key group disposed in opposite sides of the front panel surface across the display opening.

Each of the left key group and the right key group includes a plurality of letter input keys including at least one horizontal key group that includes a plurality of key buttons arranged in an outwardly direction from the display opening proximate to the display opening, and a plurality of character input keys disposed above or below the plurality of letter input keys and includes a plurality of key buttons.

The display unit includes a base line that extends in a horizontal direction across a width therein.

At least one of the opposite sides of the front panel surface can be provided with a function input unit to selectively input one or more functions.

The function input unit includes a Hall mouse disposed below one of the first key group and the second key group on the front panel surface and used to select at least one of a mouse function and a multi-arrow key function.

The Hall mouse can be disposed in a center region of one of the opposite sides of the main body.

The function input unit can also include a mouse function unit disposed in the other one of the first key group and the second key group on the front panel surface and operably corresponding to the mouse function.

The function input unit can also include a function-setting unit disposed in the other one of the opposite sides of the main body and used to selectively set a function.

The function-setting unit can be disposed in a center region of the other one of the opposite sides of the main body.

The additional input unit includes at least one of a camera unit disposed in the main body to photograph an object, an information reader to read external information and a microphone unit to input sound.

The microphone unit includes array microphones arranged in a front portion of the front panel surface at predetermined intervals.

The main body includes a rounded surface extending around at least a portion of an outside perimeter of the main body, and the can be disposed on the rounded surface.

The camera unit comprises a first camera disposed on the front panel surface and a second camera disposed on a rear surface of the main body.

The portable information processing apparatus can also include a speaker unit disposed in a third portion of the front panel surface.

The display unit can include a touch screen function.

The at least one horizontal key group includes a plurality of horizontal key groups arranged in a direction from an upper portion to a lower portion of the front panel along an edge of the display opening.

The plurality of horizontal key groups each form an angle with respect to the base line and the angles gradual increase or decrease proceeding along a direction from the upper portion to the lower portion of the front panel surface along the edge side of the display opening.

The foregoing and/or other aspects and utilities of the present general inventive concept can also be achieved by a portable information processing apparatus, including a front panel surface having a left panel surface, a right panel surface, an upper portion and a lower portion, a display unit to display an image disposed between the left panel surface, the right panel surface, the upper portion and the lower portion, and a first horizontal key group having a first set of key buttons arranged in an outwardly direction from the display unit disposed on one of the left panel surface and the right panel surface, a second horizontal key group having a second set of key buttons arranged in an outwardly direction, the second horizontal key group disposed below the first horizontal key group and in the one of the left panel surface and the right panel surface, wherein the first horizontal key group and the second horizontal key group each form an angle in a direction from the upper portion to the lower portion of the front panel surface with a base line that extends horizontally across a width of the display unit, and the angle formed by the first horizontal key group is different than the angle formed by the second horizontal key group.

The foregoing and/or other aspects and utilities of the present general inventive concept can also be achieved by providing a portable information processing apparatus, including a front panel surface having a left panel surface, a right panel surface, an upper portion and a lower portion, a first set of horizontal key groups arranged vertically to each other and disposed in the left panel surface, a second set of horizontal key groups arranged vertically to each other and disposed in the right panel surface, and each of the first set and the second set of horizontal key groups having a plurality of key buttons, the plurality of key buttons of the first set and the second set of horizontal key groups are arranged in an outwardly direction opposite from each other, wherein each of the first set of horizontal key groups and each of the second set of horizontal key groups form an angle in a direction from the upper portion to the lower portion of the front panel surface with a base line that extends horizontally across a width of the display unit, and the angle formed by each of the first set of horizontal key groups are not all equal to each other.

BRIEF DESCRIPTION OF THE DRAWINGS

These and/or other aspects and utilities of the present general inventive concept will become apparent and more readily appreciated from the following description of the embodiments, taken in conjunction with the accompany drawings of which.

DETAILED DESCRIPTION OF THE PREFERRED EMBODIMENTS

Figure 1:
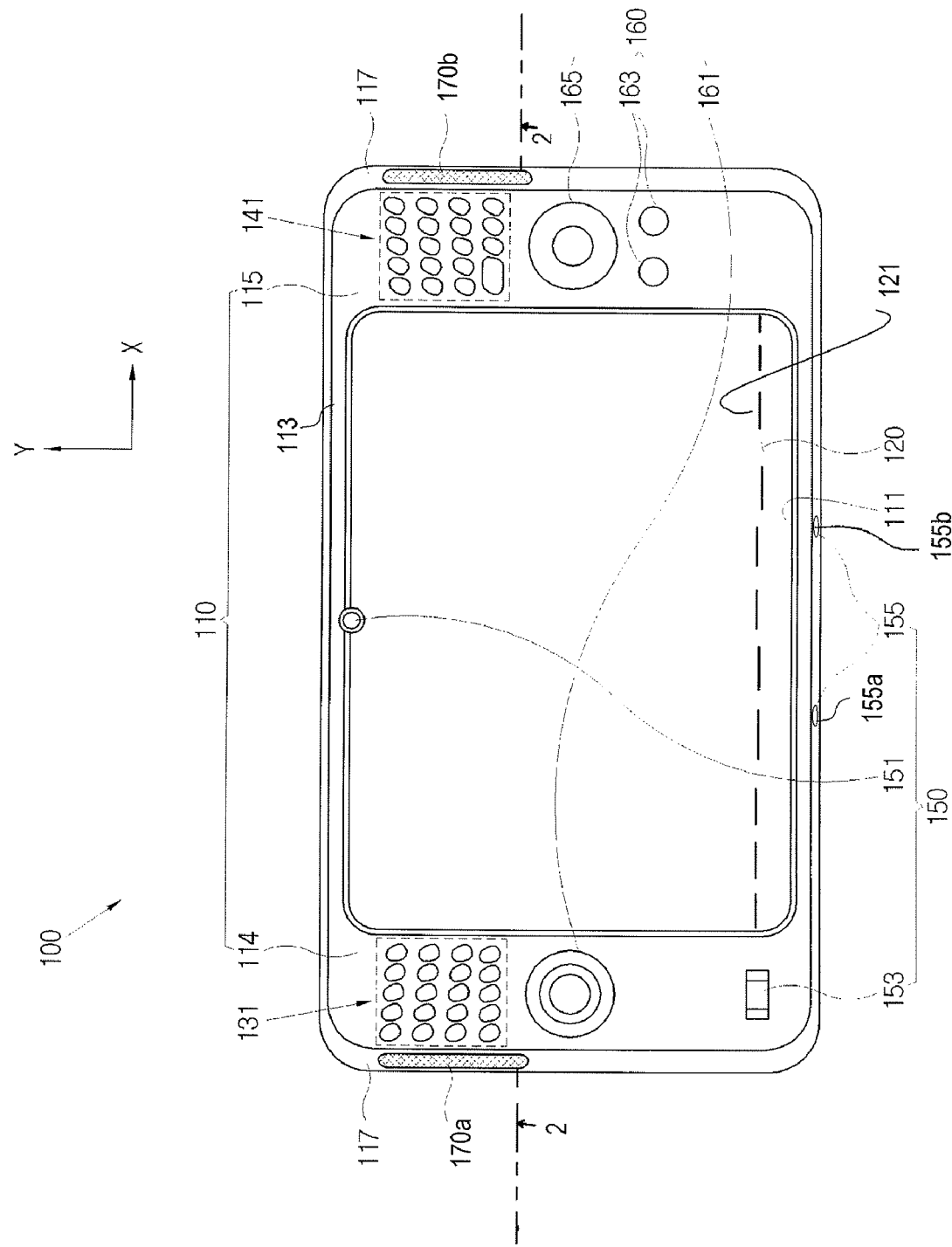
FIG. 1 is a front view illustrating a portable computer according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

As illustrated in FIGS. 1 through 5, a portable computer 100 includes a main body 110, a display unit 120, a key button input unit 130 and an additional input unit 150. Further, the portable computer 100 includes a function input unit 160. Also, the portable computer 100 includes a controller 180. In addition, the portable computer 100 may be connected to an external keyboard (not illustrated) or the like as necessary.

As illustrated in FIG. 1, the main body 110 forms an overall outer appearance of the portable computer 100, and has a display opening 111 in the middle thereof, through which an image of the display unit 120 is exposed. Further, the main body 110 includes a front panel surface 113 in the front thereof. The main body 110 may also include a supporting bracket 119 (FIG. 2) protruding from a back surface thereof and allowing the main body 110 to be supported, for example, when used on an installation surface such as a desk. Thus, the supporting bracket 119 allows a user to easily hold the portable computer 100 in both hands.

The main body 110 may also include a supporting stand (not illustrated) that rotates with respect to the main body 110, supports the main body 110 at an inclined angle to the installation surface, and is disposed in the back surface of the main body 110.

Figure 5:
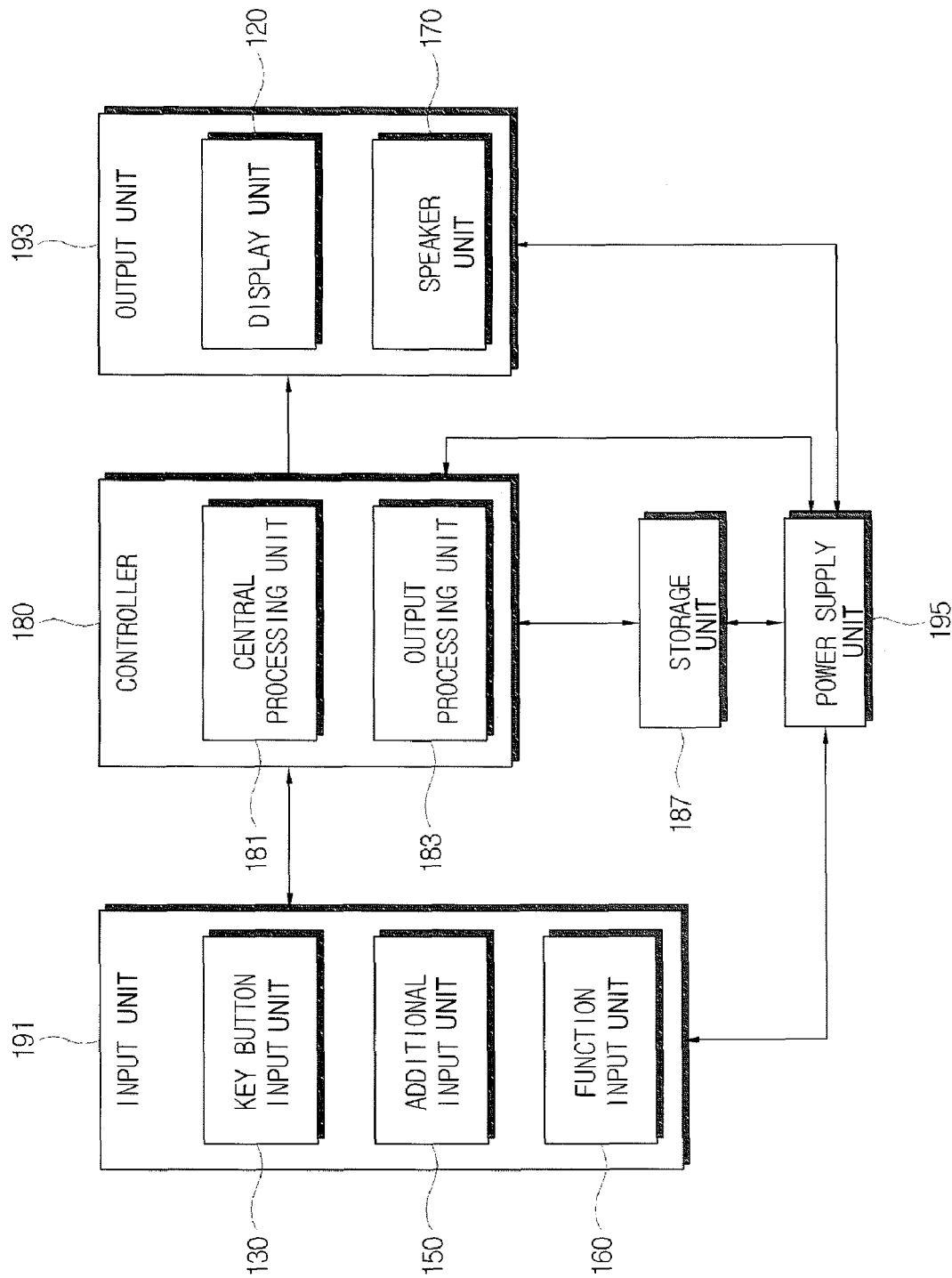
FIG. 5 is a control block diagram illustrating the portable computer of FIG. 1, according to an exemplary embodiment of the present general inventive concept.

The front panel surface 113 is provided in the front of the main body 110 and forms a frontal appearance of the portable computer 100. Further, the front panel surface 113 is provided with an input unit 191 and an output unit 193 thereon. The input unit 191 may include various input units such as a key button input unit 130, an additional input unit 150 and a function input unit 160 (FIG. 5). The output unit 193 may include various output units such as a display unit 120 and a speaker unit 170 (FIG. 5).

Referring to FIG. 1, a right panel surface 115 is disposed at a right side of the display opening 111 of the front panel surface 113, and provided with a right key group 141 and a portion of the function input unit 160.

A left panel surface 114 is disposed at a left side of the display opening 111 of the front panel surface 113, and provided with a left key group 131, the other portion of the function input unit 160, and an information recognizer 153.

Figure 2:
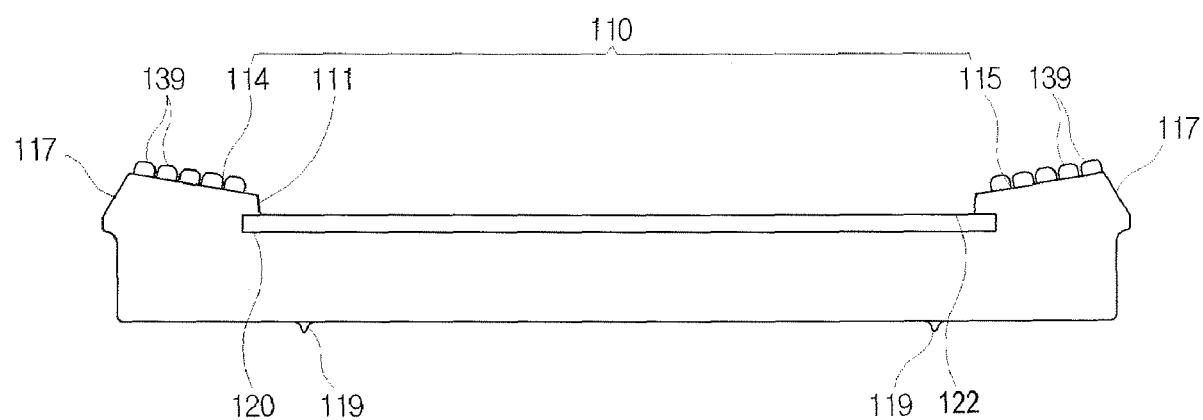
FIG. 2 is a sectional view of FIG. 1, taken along line 2-2.

As illustrated in FIG. 2, the left panel surface 114 and the right panel surface 115 may be provided at an inclined angle to a base plane 122 of the display unit 120. The base plane 122, illustrated by the horizontal and vertical axes in FIG. 1, can be a plane including the viewing surface of the display unit 120. For example, an angle between each panel surface 114 and 115 and the base plane 121 may gradually increase or decrease as the left panel surface 114 and the right panel surface 115 goes or proceeds in an outwardly direction from the display opening 111. In an embodiment of the present general inventive concept, the left panel surface 114 and the right panel surface 115 may be concave or convex with a predetermined radius of curvature. Thus, the appearance of the front panel surface 113 is enhanced and key buttons 139 are efficiently arranged in the portable computer 100.

Referring to FIG. 1, a rounded surface 117 is curved and extended backward from right and left ends of the portable computer 100. A speaker unit 170, for example, includes speakers 170a and 170b respectively disposed in the rounded surface 117 in the left side and the right side of the portable computer 100. Thus, the speaker unit 170 provided in the rounded surface 117 effectively provides a user with sound. Further, this speaker arrangement enhances space efficiency of the front panel surface 113.

Referring to FIGS. 1 and 2, the display unit 120 displays an image through the display opening 111. Information input through the input unit 191 (FIG. 5) and data are processed by operation, determination, etc. of a central processing unit 181 (FIG. 5), and then converted into a predetermined signal, so that the display unit 120 displays an image based on the converted signal. The display unit 120 may have a touch screen function that enables a user to input information with a pen or the like. The display unit 120 is generally disposed in the center of the front panel surface 113 and can be any one of a variety of sizes. In this embodiment of the present general inventive concept, the display unit 120, having a diagonal length of "7" inches will be described by way of example. The display unit 120 of a "7" inch screen includes a base line 121. The base line 121 is illustrated as a horizontal line extending across a width of the display unit 120. For example, a reference line extending in a horizontal, i.e., lengthwise, direction (refer to an "X" direction in FIG. 1) of the display unit 120.

Figure 3:
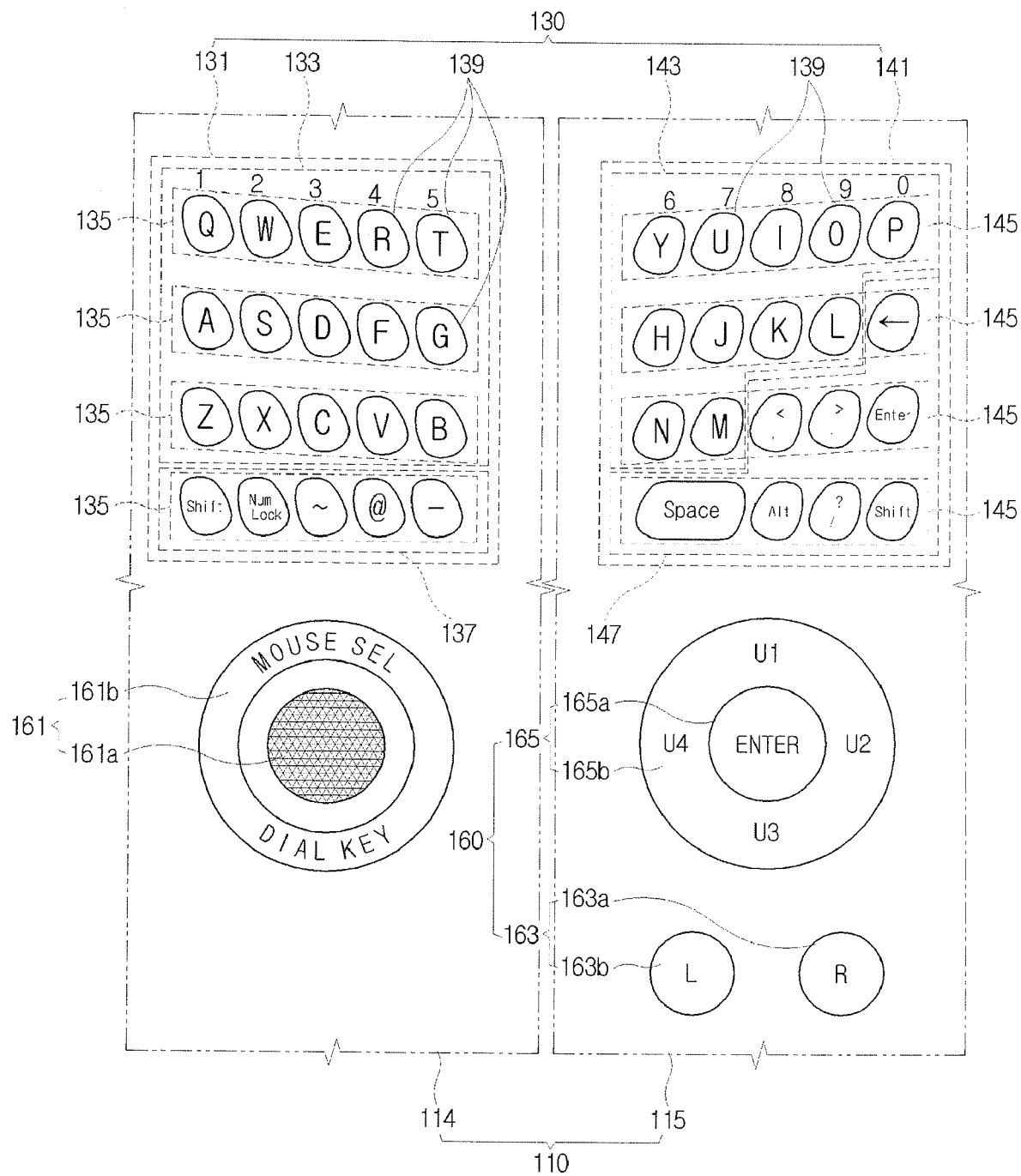
FIG. 3 is a partial layout of a left panel and a right panel of FIG. 1.

Referring to FIGS. 3 and 5, the key button input unit 130 includes the left key group 131 and the right key group 141 which are disposed in opposite sides of the front panel surface 113 (FIG. 1) across the display opening 111 (FIGS. 1 and 2), respectively. The key button input unit 130 is included in the input unit 191, and allows a user to input letters, characters, etc. Further, the key button input unit 130 may have various functions as necessary. Thus, a user can conveniently input information such as text or the like while holding the main body 110 in his/her hands.

The left key group 131 is disposed in the left panel surface 114, and includes left letter input keys 133 and left character input keys 137.

The right key group 141 is disposed in the right panel surface 115, and includes right letter input keys 143 and right character input keys 147.

Referring to FIG. 3, the letter input keys 133 and 143 are disposed in the left and right key groups 131 and 141, respectively. Further, the letter input keys 133 and 143 include a plurality of horizontal key groups 135 and 145 including key buttons arranged in an outwardly direction from the display opening 111. In an embodiment of the present general inventive concept, the left letter input keys 133 and the right letter input keys 143 include at least one of the horizontal key groups 135 and 145, respectively. For example, the left letter input keys 133 may include one or more of the respective horizontal key groups 135 and the right letter input keys 143 may include one or more of the other respective horizontal key groups 145. For example, the letter input keys 133 and 143 may be based on a keyboard for Hangeul with consonant and vowel sound keys and English with alphabet keys. Accordingly, the letter input keys 133 and 143 may be localized so that they can vary according to languages. In an embodiment of the present general inventive concept, the letter input keys 133 and 143 are positioned in upper portions of the right and left panel surfaces 114 and 115 so that a user can relatively freely move his/her thumbs and have an efficient path of manipulation while gripping the main body 110.

In an exemplary embodiment of the present general inventive concept, the letter input keys 133 and 143 are based on a "2-Bul" Korean input method and a "QWERTY" English input method. Alternatively, the letter input keys 133 and 143 may be based on a "3-Bul" Korean input method and a "QWERTY" English input method, or some other input method.

The horizontal key groups 135 and 145 are disposed on the same row of the left and right letter input keys 133 and 143. The horizontal key groups 135 and 145 include a plurality of key buttons 139. According to an exemplary embodiment of the present general inventive concept, each of the horizontal key groups 135 and 145 includes five key buttons 139. Alternative embodiments of the present general inventive concepts, however, may include horizontal key groups 135 and 145 including more or less than five key buttons 139.

In an embodiment of the present general inventive concept, each of the horizontal key groups 135 and 145 may be disposed in a direction from an upper portion to a lower portion of the front panel surface 113 along an edge side of the display opening 111. In this embodiment, the horizontal key groups 135 and 145 are arranged in four rows. Alternative embodiments, however, may include horizontal key groups 135 and 145 arranged in more or less than four rows.

Figure 4:
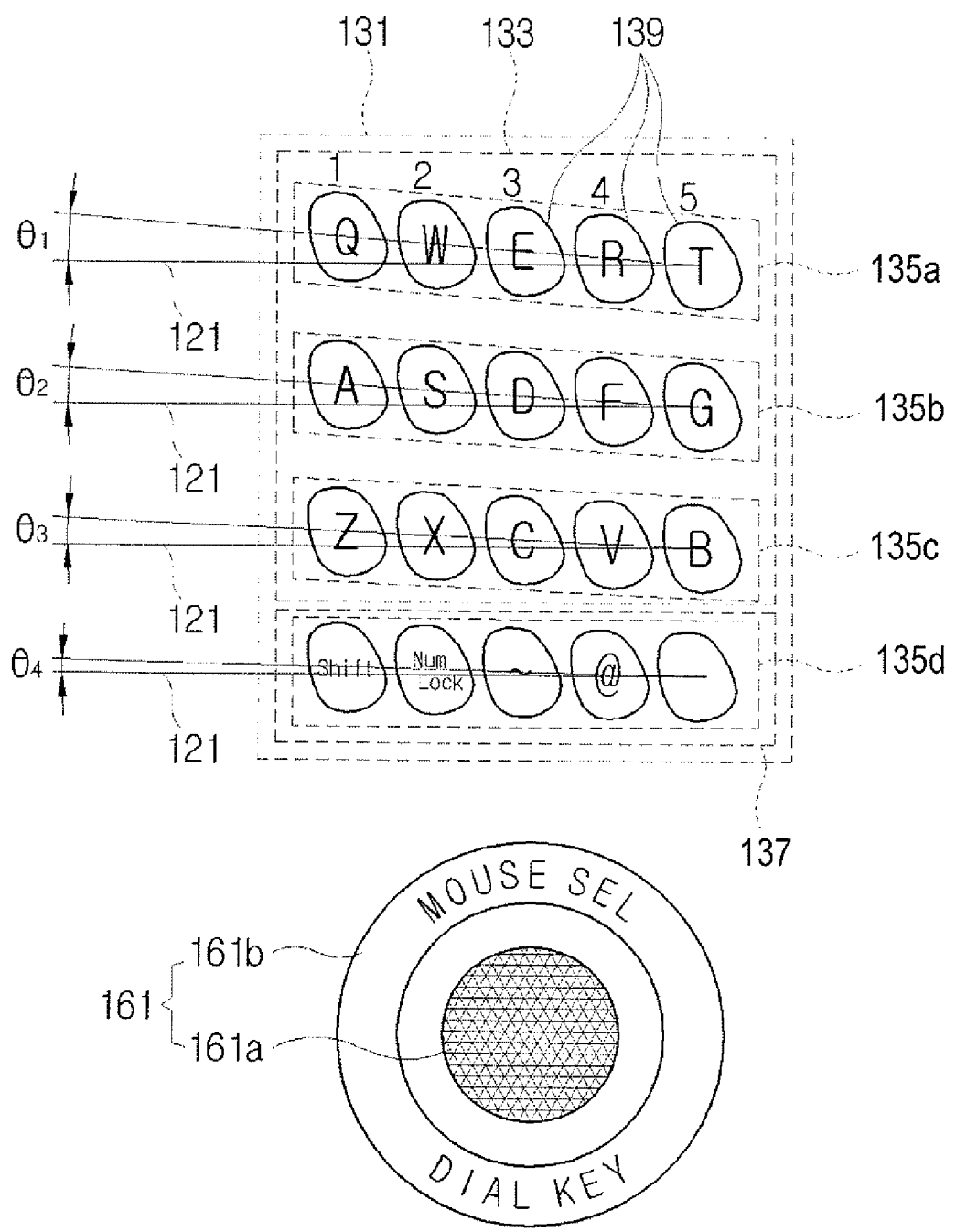
FIG. 4 is a partial enlarged perspective view illustrating an angle between each respective horizontal key group and a base line.

FIG. 4 is a partial enlarged perspective view illustrating an angle between each respective horizontal key group 135a, 135b, 135c and 135d and a base line 121. For clarification purposes, FIG. 4 illustrates the plurality of respective horizontal key groups 135 in the left panel surface 114. It is within the scope of the present general inventive concept, however, that the description with respect to FIG. 4 can be also applied to the plurality of respective horizontal key groups 145 in the right panel surface 115. For example, in an embodiment of the present general inventive concept, the horizontal key groups 135 and 145 are arranged so that at least some of the angles formed between the base line 121 and the horizontal key groups 135 and 145 can gradually decrease or increase proceeding along a direction from the upper portion to the lower portion of the front face panel 113 along the edge side of the display opening 111. Referring to FIG. 4, the angles formed between the base line 121 and the uppermost and first horizontal key group 135a, the second horizontal key group 135b, the third horizontal key group 135c and the fourth horizontal key group 135d be θ1, θ2, θ3 and θ4, respectively. In an embodiment of the present general inventive concept, the angles between the base line 121 and the respective horizontal key groups 135 and 145 may vary according to the size of the display unit 120, the size of each key button 139, the intervals between the key buttons, the intervals between the horizontal key groups 135 and 145, a user's stature, etc.

As illustrated in FIG. 4, the angles between the base line 121 and the horizontal key groups 135a to 135d gradually decrease proceeding along the direction from the upper portion to the lower portion of the front panel surface 113. Accordingly, the respective horizontal key groups 135a to 135d are arranged so that the angles of the base line 121 and the respective horizontal key groups 135a to 135d can satisfy θ1>θ2>θ3>θ4.

In another embodiment of the present general inventive concept, the angles between the base line 121 and the respective horizontal key groups 135 and 145 may gradually increase proceeding along the direction from the upper portion to the lower portion of the front panel surface 113. In this embodiment, the horizontal key groups 135 and 145 are arranged so that the angles between the base line 121 and the respective horizontal key groups 135 and 145 can satisfy θ1<θ2<θ3<θ4.

In yet another embodiment of the present general inventive concept, the angles between the base line 121 and the respective horizontal key groups 135 and 145 may gradually increase and then decrease or decrease and then increase proceeding along a direction from the upper portion to the lower portion of the front panel surface 113. For example, the horizontal key groups 135 and 145 are arranged so that the angles between the base line 121 and the respective horizontal key groups 135 and 145 can satisfy θ1>θ2>θ3<θ4.

In yet another embodiment of the present general inventive concept, the same varying pattern of the angles between the base line 121 and the respective horizontal key groups 135 and 145 is applied to both the left panel surface 114 and the right panel surface 115. Alternatively, different varying pattern of the angles between the base line 121 and the horizontal key groups 135 and 145 may be applied to the left panel surface 114 and the right panel surface 115, respectively. For example, in the left panel surface 114, the key buttons 139 of the respective horizontal key groups 135 are arranged so that the angle between the base line 121 and them can gradually increase proceeding along a direction from the upper portion to the lower portion of the front panel 113, but in the right panel surface 115, the key buttons 139 of the respective horizontal key groups 1145 are arranged so that the angle between the base line 121 and them can gradually decrease proceeding along a direction from the upper portion to the lower portion of the front panel surface 113.

Accordingly, while a user inputs information such as text or the like with both hands while gripping the main body 110, an efficient path of manipulation with an input mechanism such as a thumb is secured. When left and right fingers move between the key buttons 139 of the key button input unit 130, interference by neighboring key buttons 139 to a user's manipulation of the key buttons 139 is minimized. Thus, while pushing one of the key buttons 139, neighboring key buttons 139 are not inadvertently pressed. Further, this arrangement of the key buttons 139 enhances the outer appearance of the front panel surface 113.

Referring to FIG. 3, in an embodiment of the present general inventive concept, the character input keys 137 and 147 are disposed above or below the letter input keys 133 and 143, and include a plurality of key buttons 139. The character input keys 137 and 147, for example, are included in horizontal key groups 135 and 145 corresponding to each other and provided in the left panel surface 114 and the right panel surfaces 115. For example, the left character input keys 137 includes a "Shift" key, a "Num Lock" key, a "~" key, a "@" key, and a "-" key in an inwardly direction from an outside of the left panel surface 114 toward the display opening 111. The right character input keys 147 includes a "Space" key, an "Alt" key, a "?" key, and a "Shift" key in an outwardly direction from the display opening 111 toward an outside of the right panel surface 115. In addition, the right character input keys 147 may include a "←" key, an "Enter" key, etc. on the horizontal key group 145 also including one or more of the right letter input keys 143 in the right panel surface.

The character input keys 137 and 147 may be provided in both, or either, of the left panel surface 114 and the right panel surface 115, and may include a plurality of horizontal key groups. Further, the size of the character input keys 137 and 147 may vary according to a user's using frequency, disposed positions, etc.

Accordingly, a user can easily input information such as text or data like a keyboard while holding the left and right sides of the main body 110 in both hands.

Referring to FIG. 1, the additional input unit 150 is disposed in the left or right side of the front panel surface 113, and may include at least one of a camera 151, an information reader 153, and a microphone unit 155.

The camera unit 151 may be disposed in a front center portion of the front panel surface 113, and photographs an object. Further, the camera unit 151 may include another camera disposed in the rear of the main body 110 as well as a camera in the front panel surface 113, so that it can photograph other objects such as a landscape. The position of the camera unit 151 may vary as necessary.

The information reader 153 may be disposed in a left side of the front panel surface 113, and reads a user's information. The information reader 153 may include a fingerprint reader to read a user's fingerprint, and/or other conventional devices to read the iris, the retina or the like of a user.

The microphone unit 155 allows a user to input a sound such as a voice. The microphone unit 155 may include a pair of microphones 155a and 155b, which may be disposed in a lower portion of the front panel surface 113 and spaced apart from each other. The microphone unit 155 may include an array microphone. Thus, noise interfering with an input sound is minimized.

The function input unit 160 may be disposed in at least one of the left and right sides of the front panel surface 113, thereby allowing a user to selectively input various functions. The function input unit 160, for example, includes a Hall mouse 161, a mouse function key 163, and a function-setting unit 165. Further, the function input unit 160 may also include additional keys corresponding to various functions.

The Hall mouse 161 may be disposed in the left side of the front panel surface, and has a mouse function and an arrow-key function. The Hall mouse 161 includes, for example, a Hall moving member 161a disposed in the center thereof and provided to move an icon or a pointer on the display unit 120, and a Hall selector 161b shaped like a circle surrounding the Hall moving member 161a and provided to select a function of the Hall moving member 161a. The Hall mouse 161 may be provided in the center of the left panel surface 114 so that a user's thumb can easily reach the Hall mouse 161. Alternatively, the Hall mouse 161 may be disposed in the right side of the front panel surface 113.

The mouse function unit 163 is disposed in the right side of the front panel surface 113 and operates in cooperation with the selection of the mouse function in the Hall mouse 161. The mouse function unit 163 includes a left mouse function key 163b and a right mouse function key 163a.

The left mouse function key 163b clicks a function pointed to by a pointer or the like moved by the Hall mouse 161.

The right mouse function key 163a performs a function to pop up a predetermined function at a position where the pointer is moved in cooperation with the Hall mouse 161. For example, if the right mouse function key 163a is pushed in the state that the pointer is moved by the Hall mouse 161, a block to select functions such as "copy," "paste," "paragraph" or the like is popped up, thereby allowing a user to select a predetermined function in the popped-up block.

Alternatively, the mouse function unit 163 may be disposed in the left side of the front panel surface 113.

The function-setting unit 165 may be disposed in the right side of the front panel surface 113, and allows a user to set the functions. The function-setting unit 165 includes an "Enter" key 165a disposed in the center thereof, and a function-setting member 165b shaped liked a circle around the "Enter" key 165a and allowing a user to select a desired function. According to an exemplary embodiment of the present general inventive concept, the function-setting member 165b may set four functions, U1 through U4.

The function-setting unit 165 may be disposed in the center of the right panel surface 115 in consideration of the manipulation path of the thumbs of a user while the user grips the main body 110. Alternatively, the function-setting unit 165 may be disposed in the left side of the front panel surface 113.

In an embodiment of the present general inventive concept, the sizes of the Hall mouse 161, the mouse function unit 163, and the function-setting unit 165 may be determined in consideration of the size of the display unit 120, the sizes of the left and right panel surfaces 114 and 115, etc.

Accordingly, the function input unit 160 efficiently arranged on the front panel surface 113 allows a user to conveniently use the portable computer 100 while gripping the main body 110.

FIG. 5 is a control block diagram illustrating the portable computer 100 of FIG. 1, according to an exemplary embodiment of the present general inventive concept. Referring to FIG. 5, the controller 180 includes a central processing unit 181 to perform reading, operation, determination, etc. on the basis of input information, input data, etc.; and an output processing unit 183 to process the input information or the like processed by the central processing unit 181 to be output through the output unit 193.

The input unit 191 is provided in the main body 110 and transmits information to the controller 180 and/or a storage unit 187 of the main body 110 by various methods. According to an exemplary embodiment of the present general inventive concept, the input unit 191 includes the key button input unit 130, the additional input unit 150, and the function input unit 160. Alternatively, the input unit 191 may additionally include conventional input units as necessary.

The output unit 193 outputs the information or the like that is input through the input unit 191 and processed by the controller 180. According to an exemplary embodiment of the present general inventive concept, the output unit 193 includes the display unit 120, and the speaker unit 170. The main body 110 may be connected to an output apparatus such as a printer (not illustrated) or the like to thereby output the information or the like. Additionally, the output unit 193 may include a small indicator (not illustrated) that informs a user of whether power is on or off as well as the display unit 120.

The storage unit 187 stores the information processed by the controller 180 or input through the input unit 191. The information stored in the storage unit 187 may be used in the controller 180 as necessary.

The power supply unit 195 supplies power, for example, to the display unit 120, the speaker unit 170, and the controller 180 of the portable computer 100.

Meanwhile, other internal configurations of the portable computer 100 are easily understood by persons skilled in the art, so that descriptions thereof will be omitted.

Operations of the portable computer 100 according to an exemplary embodiment of the present general inventive concept will be described with reference to FIGS. 1 through 5.

A user holds the main body 110 of the portable computer 100 in his/her left and right hands. Accordingly, a user's palms may be in contact with left and right bottoms of the front panel surface 113, and the back of the main body 110 may be held with, for example, the remaining fingers of the user's hand, excluding the thumbs. For example, the supporting brackets 119 may be held with eight fingers of both hands of the user, thereby allowing the user to stably grip the main body 110 of the portable computer 100.

The information input through the key input unit 130, the additional input unit 150 and the function input unit 160 undergoes the reading, the determination, the comparison, etc. of the central processing unit 181, and then is stored in the storage unit 187; displayed as an image on the display unit 120 via the output processing unit 183; or output as a sound through the speaker unit 170.

Accordingly, a user can use his/her left and right thumbs to input information such as letters and characters through the key button input unit 130 that is efficiently disposed in the portable computer 100. For example, the horizontal key groups 135 and 145 are disposed so that an angle between the horizontal key groups 135 and 145 and the base line 121 can gradually decrease proceeding along a direction from the upper portion to the lower portion of the front panel surface 113 of the portable computer 100, thereby providing an efficient and convenient manipulation path of the thumbs. In an embodiment of the present general inventive concept, for example, interference of the manipulation path of the thumb is minimized, thereby providing convenience for a user to use the portable computer 100.

Further, the Hall mouse 161 may be of a relatively large size and disposed in the center of the left panel surface 114 of the front panel surface 113 in consideration of providing an efficient and convenient manipulation path of a user, thereby providing convenience and reducing user fatigue due to use of the portable computer 100.

As described above, in various embodiments of the present general inventive concept, the input unit and/or the output unit is efficiently disposed in the portable computer, thereby providing convenience with the usability and enhancing the outer appearance of the portable computer.

Further, in various embodiment of the present general inventive concept, the manipulation path for a user to make an input selection is minimized, thereby reducing user fatigue due to use of the portable computer.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A portable information processing apparatus, comprising:
    a main body including a display opening and a front panel surface surrounding the display opening, the display opening being provided in a center portion of the front panel surface;
    a display unit to display an image through the display opening, the display unit comprising a base line that extends in a horizontal direction across a width therein;
    a key button input unit oppositely arranged across the display unit in a first portion of the front panel surface, the key button input unit including a left key group and a right key group, each group comprising a plurality of rows of input keys, each of the plurality of rows of input keys being arranged in a respective outwardly direction from the display opening proximate to the display opening; and
    an additional input unit including at least one additional input unit in a second portion of the front panel surface,
    wherein each respective outwardly direction forms a respective angle with respect to the base line, and the angles within each group gradually increase or decrease in a direction from the upper portion of the front panel surface to the lower portion of the front panel surface along the edge of the display opening.

2. The apparatus according to claim 1, wherein each of the left key group and the right key group comprises:
    a plurality of letter input keys; and
    a plurality of character input keys.

3. The apparatus according to claim 1, wherein at least one of the opposite sides of the front panel surface is provided with a function input unit to selectively input one or more functions.

4. The apparatus according to claim 3, wherein the function input unit comprises a Hall mouse disposed below one of the first key group and the second key group on the front panel surface and used to select at least one of a mouse function and a multi-arrow key function.

5. The apparatus according to claim 4, wherein the Hall mouse is disposed in a center region of one of the opposite sides of the main body.

6. The apparatus according to claim 5, wherein the function input unit, further comprises:

a mouse function unit disposed in the other one of the first key group and the second key group on the front panel surface and operably corresponding to the mouse function.

7. The apparatus according to claim 3, wherein the function input unit, further comprises:
a function-setting unit disposed in the other one of the opposite sides of the main body and used to selectively set a function.

8. The apparatus according to claim 7, wherein the function-setting unit is disposed in a center region of the other one of the opposite sides of the main body.

9. The apparatus according to claim 1, wherein the additional input unit comprises at least one of a camera unit disposed in the main body to photograph an object;
an information reader to read external information; and a microphone unit to input sound.

10. The apparatus according to claim 9, wherein the microphone unit includes array microphones arranged in a front portion of the front panel surface at predetermined intervals.

11. The apparatus according to claim 10, wherein the main body comprises:
a rounded surface extending around at least a portion of an outside perimeter of the main body, and the speaker unit is disposed on the rounded surface.

12. The apparatus according to claim 9, wherein the camera unit comprises:
a first camera disposed on the front panel surface; and a second camera disposed on a rear surface of the main body.

13. The apparatus according to claim 1, further comprising:
a speaker unit disposed in a third portion of the front panel surface.

14. The apparatus according to claim 1, wherein the display unit comprises a touch screen function.

15. A portable information processing apparatus, comprising:
a front panel surface having a left panel surface, a right panel surface, an upper portion and a lower portion;
a display unit to display an image disposed between the left panel surface, the right panel surface, the upper portion and the lower portion;
a first key group having a first set of key buttons arranged in an outwardly direction from the display unit disposed in one of the left panel surface and the right panel surface; and
a second key group having a second set of key buttons arranged in an outwardly direction, the second key group disposed below the first key group and in the one of the left panel surface and the right panel surface;
wherein the first key group and the second key group each form an angle in a direction from the upper portion to the lower portion of the front panel surface with a base line that extends horizontally across a width of the display unit, and the angle formed by the first key group is different than the angle formed by the second key group.

16. The apparatus according to claim 15, wherein the angle formed by the first key group is greater than the angle formed by the second key group.

17. The apparatus according to claim 15, wherein the angle formed by the first key group is less than the angle formed by the second key group.

18. The apparatus according to claim 15, further comprising:
a third key group having a third set of key buttons arranged in an outwardly direction from the display unit disposed on the other one of the left panel surface and the right panel surface; and
a fourth key group having a fourth set of key buttons arranged in an outwardly direction, the fourth key group disposed below the third key group and in the other one of the left panel surface and the right panel surface;
wherein the third key group and the fourth key group each form an angle in the direction from the upper portion to the lower portion of the front panel surface with the base line that extends horizontally across the width of the display unit, and the angle formed by the third key group is different than the angle formed by the fourth key group.

19. The apparatus according to claim 18, wherein the angle formed by the third key group is greater than the angle formed by the fourth key group.

20. The apparatus according to claim 18, wherein the angle formed by the third key group is less than the angle formed by the fourth key group.

21. The apparatus according to claim 18, wherein:
the angle formed by the third key group corresponds to the angle formed by the first key group; and
the angle formed by the fourth key group corresponds to the angle formed by the second key group.

22. A portable information processing apparatus, comprising:
a front panel surface having a left panel surface, a right panel surface, an upper portion and a lower portion;
a first set of key groups arranged vertically to each other and disposed on the left panel surface; and
a second set of key groups arranged vertically to each other and disposed on the right panel surface,
each of the first set and the second set of key groups having a plurality of key buttons, the plurality of key buttons of the first set and the second set of key groups are arranged in an outwardly direction opposite from each other;
wherein each of the first set of key groups and each of the second set of key groups forms an angle in a direction from the upper portion to the lower portion of the front panel surface with a base line that extends horizontally across a width of the display unit, and the angles formed by each of the first set of key groups are not all equal to each other.

23. The apparatus according to claim 22, wherein the angles formed by each of the second set of key groups are not equal to each other.

24. The apparatus according to claim 22, further comprising:
a display unit to display an image disposed between the left panel surface, the right panel surface, the upper portion and the lower portion.

* * * * *